United States Patent [19]
Erwin, Jr.

[11] 3,750,463
[45] Aug. 7, 1973

[54] FUEL MEASURING SYSTEM FOR VEHICLES

[76] Inventor: Curtis L. Erwin, Jr., 5805 S.E. Gladstone St., Portland, Oreg. 97206

[22] Filed: July 10, 1970

[21] Appl. No.: 53,970

Related U.S. Application Data

[63] Continuation of Ser. No. 733,961, June 3, 1968.

[52] U.S. Cl. ............................................... 73/113
[51] Int. Cl. ............................................. B60k 15/02
[58] Field of Search ............................. 73/113, 112

[56] References Cited
UNITED STATES PATENTS
| | | | |
|---|---|---|---|
| 3,512,600 | 5/1970 | Adams | 180/77 |
| 3,369,394 | 2/1968 | Higgs | 73/113 |
| 3,252,322 | 5/1966 | Pring | 73/113 |

Primary Examiner—Richard C. Queisser
Assistant Examiner—Arthur E. Korkosz
Attorney—Eugene M. Eckelman

[57] ABSTRACT

The fuel measuring system of the invention is intended for use with a vehicle of the type wherein its fuel mixing device returns unburned fuel to the fuel supply. Such system includes an air bubble eliminator and further includes a fuel by-pass provided with a meter. A valve is included in the system which has two positions a first one of which provides normal flow of fuel to the fuel mixing device and a second one of which provides flow through the by-pass to measure the flow. The valve is operably connected to the emergency brake or a power take-off so that it is moved to its second position when the emergency brake or power take-off is activated. Also included in the system is a second meter arranged to measure total flow of fuel from the fuel tank of the vehicle. The valve and the meter associated with the by-pass are preferably incorporated in a single compact housing.

10 Claims, 5 Drawing Figures

CURTIS L. ERWIN, JR.
INVENTOR

PATENTED AUG 7 1973 3,750,463

CURTIS L. ERWIN, JR.
INVENTOR.

BY Eugene M. Eckelman
ATTY.

FUEL MEASURING SYSTEM FOR VEHICLES

This is a continuation of application, Ser. No. 733,961, filed June 3, 1968, now abandoned for Fuel Measuring System For Vehicles.

BACKGROUND OF THE INVENTION

This invention relates to new and useful improvements in fuel measuring systems for vehicles and particularly to those systems intended to measure fuel used while the vehicle is operating off the highway or in other circumstances wherein operating fuel is not taxable.

Most of the states and the Federal Government have provisions for refunding the tax on fuels which are used in vehicles operated on private property or on other than state or Federal highways. While hauling vehicles consume a substantial quantity of fuel which is taxable, they may also consume a substantial quantity of fuel which is not taxable such as in off-highway use. It is of course difficult to estimate the amount of fuel used during the time the truck is off the highway, and the various tax commissions involved are reluctant to accept the estimates given. It has been found, however, that the tax commissions will accept gallonage figures measured automatically by an accurate measuring system which is automatically activated when the vehicle is parked with its emergency brakes set or during the time that a power take-off of the vehicle is used, or which in any way measures fuel used by the vehicle engine or an auxiliary engine for non-taxible purposes.

Some vehicle engines, such as diesels, use a fuel mixing device which returns unburned fuel to the fuel supply system. The returning of such fuel creates problems in the measuring of either total or partial fuel flow in that air bubbles in the returned fuel prevent accurate measurement.

SUMMARY OF THE INVENTION

It is an object of the invention to provide a system which employs in combination a by-pass in which is included a meter for measuring non-taxable fuel consumption, means connecting a fuel return line from the mixing device to a fuel line beyond the meter so that the return flow is not metered, air bubble eliminating means, and valve means which are operable by the vehicle emergency brake or power take-off so that in one position of the valve means normal flow of fuel from the tank to the fuel mixing device is provided and in another position of the valve means flow through the by-pass is accomplished to meter the flow. As will be more apparent hereinafter, by providing an air bubble eliminator in the return line, such return line can be connected back into the fuel line rather than into the fuel tank whereby fuel flowing through the by-pass, which occurs when fuel flow is for off-highway purposes, is accurately measured. Furthermore, with the provision of an air bubble eliminator in the fuel return line, the total fuel flow from the fuel tank can be metered, and thus it is another object to provide full flow metering means in such a system.

It is another object to provide fuel measuring means of the type described including a novel housing incorporating the valve and the meter which measures non-taxable fuel flow and further incorporating fittings for connecting the housing to existing fuel systems.

Another object is to provide in a system of the type described a novel apparatus for eliminating air bubbles, such apparatus employing an angled baffle disposed directly below the inlet to the tank whereby incoming returned fuel impinges thereagainst to remove the bubbles, said apparatus also including a float valve for maintaining a selected liquid level in the tank.

The invention will be better understood and additional objects and advantages will become apparent from the following description which illustrates a preferred form of the device.

DESCRIPTION OF THE PREFERRED EMBODIMENT

Figure 1:
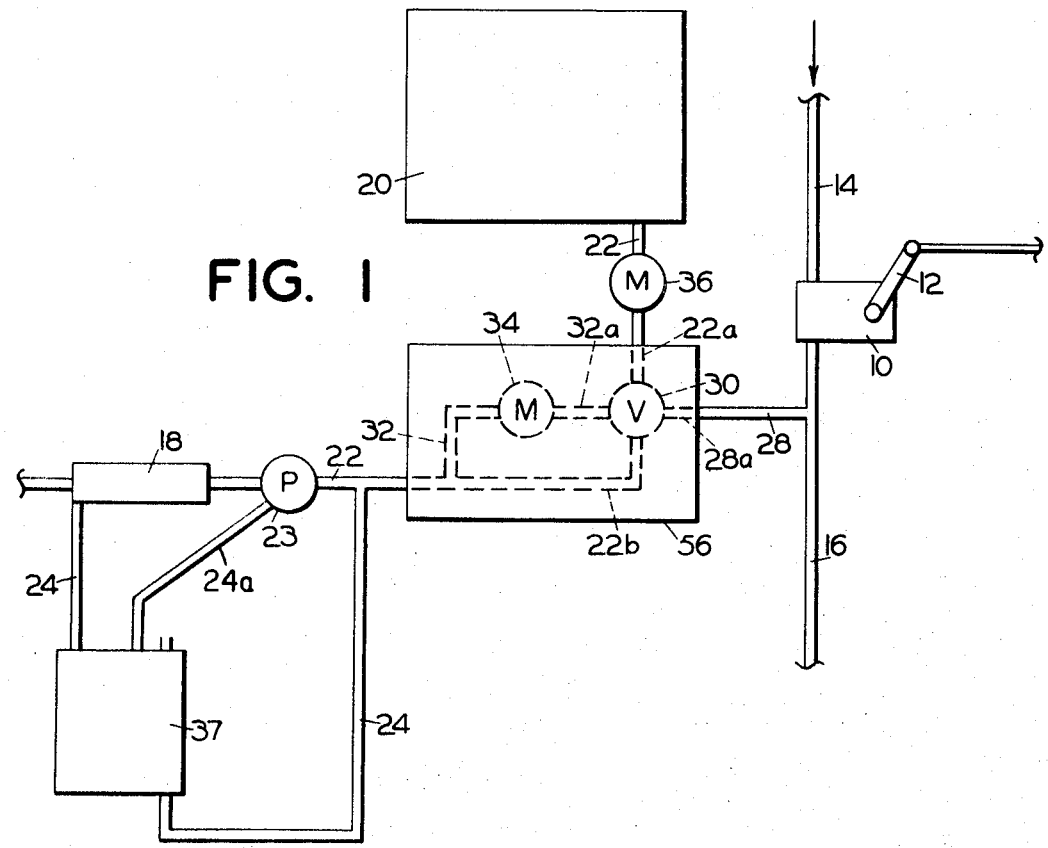
FIG. 1 is a diagrammatic view of a fuel measuring system embodying features of the present invention.

Referring now in particular to the drawings and first to FIG. 1 the invention is associated with conventional vehicle structure having emergency brake or power take-off control means 10 having a lever 12 or the like. For purpose hereof, the system will be described in connection with emergency brake means, but it is to be understood that the system may be used in connection with power takeoffs or other means which are activated when the vehicle is used for off-highway or non-taxable purposes. The emergency brake means includes a conduit 14 which leads from a conventional pump, not shown, and a conduit 16 which leads to brake setting structure on the vehicle. For purposes hereof, the lever 12 represents operating means for the emergency brake such as a manually operable member movable to activate or deactivate the system. Conventional vehicles also include fuel mixing devices 18 receiving fuel from a fuel tank 20 through a fuel line 22 having a fuel pump 23 therein. The present system is intended for use with vehicles having fuel mixing devices of the type, such as injectors, which return unburned fuel to the fuel supply system. The return line 24 of a conventional system returns the unburned fuel to the tank 20 but as seen in FIG. 1 and further described hereinafter the present system is novel in that it returns the unburned fuel to the fuel line and not the tank.

According to the present invention and still with reference to FIG. 1, a conduit or line 28 is connected into the conduit 16 of the vehicle emergency brake system and such conduit 28 leads to a valve 30 by means to be described in greater detail hereinafter. The valve will also be described in greater detail hereinafter and has connection to fuel line 22 and a by-pass 32, 32a which includes a flow meter 34. By-pass portion 32a leads from valve 30 to the flow meter and by-pass portion 32 leads from the flow meter back into the fuel line 22 by means to be described.

The valve 30 comprises a three-way valve whereby fluid can flow from tank 20 either directly through the line 22 or through the by-pass 32, 32a.

Operation of the valve 30 is controlled by the emergency brake. More particularly, when the emergency brake not activated the valve is in a position to cause fluid to flow through the line 22 as usual but when the emergency brake is activated the valve causes fluid to flow through the by-pass 32, 32a for metering.

As a part of the present invention the fuel return line 24 is connected back into the fuel line 22 on the injector side of the valve 30. Thus, the fuel return line bypasses the meter 34 in order that none of the return fuel is metered. Also forming a part of the present invention is a meter 36 connected ahead of the valve 30, or in other words between the said valve and the tank 20. This meter measures the full flow of fuel from the tank 20 regardless of whether it is used for highway or off-highway purposes, and its purpose will be set forth in greater detail hereinafter.

Figure 2:
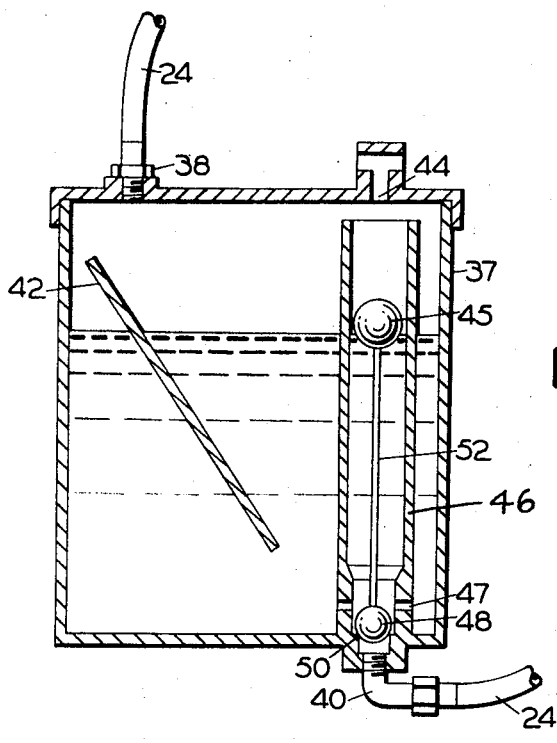
FIG. 2 is a sectional view through air bubble eliminating means employed in the system.

With reference now to FIG. 2, a bubble eliminator tank 37 is connected into the return line 24 by top and bottom connections 38 and 40, respectively. Top connection 38 comprises the inlet, and disposed below such inlet is a baffle 42 against which the incoming fluid impinges. It has been found that the use of an angled baffle, as illustrated, efficiently removes the bubbles from the fuel. An upper vent opening 44 is provided in the tank to allow the escape of the air removed from the fuel. In some cases, a return line 24a, FIG. 1, may also extend from the pump 23 into the tank 37.

The fluid level in the tank is maintained at a selected level by a float valve assembly since it is desirable that the inflow into the tank have no direct influence on the outflow. The valve assembly comprises a float 45 operating in an upright guide tube 46 having apertures 47 to allow entrance of fuel. A valve 48 is engageable with a valve seat 50 in the bottom wall of the tank and a connecting member 52 connects the float to the valve. As stated, the baffle 42 is disposed under the inlet 38 for impingement thereby of the incoming fuel, and preferably such baffle extends down below the fluid level in the tank to maintain contact of the incoming fluid with the baffle even below the fluid level to create maximum removal of the bubbles.

The valve 30 and meter 34 preferably are contained in a single compact housing 56. This housing is detailed in FIGS. 3–5 and is shown in phantom in FIG. 1. Also shown in phantom in FIG. 1 are passageways 22a, 22b, 28a, 32 and 32a which form a part of the housing. The housing has a hollow interior portion including a bore 58, FIGS. 3–5, and chambers 60 and 62 on opposite ends of the bore. Forming the operative part of the valve is a stem 64 of considerably less diameter than bore 58 and movable axially therein. Secured to opposite ends of the stem are diaphragms 66 and 68 which form end walls for the chambers 60 and 62, respectively. Diaphragms 66 and 68 are secured against shoulder portions 70 by threaded nuts or caps 72 and 74, respectively, FIG. 3, and said diaphragms have tapered hubs 76 and 78, respectively, engageable with the end edges of the bore 58 to control the flow of fuel through the valve. The arrangement of the chambers 60 and 62 is such that the stem 64 and its diaphragms are movable axially a short distance, and also the parts are arranged such that the hubs of the diaphragms in such axial movement are arranged to have wedging sealing abutment against respective end edges of the bore 58.

The valve assembly is urged in one direction, namely toward diaphragm 68 by a compression spring 80 engageable between end cap 72 and the one end of stem 64. Conduit 28 from the emergency brake system 16 is threadedly connected in opening 28a in the end cap 74, FIG. 3, by a fitting 82, and the fluid pressure in such conduit acts on the diaphragm 68 to move the stem 64 toward the cap 72, the parts being arranged such that the pressure in the emergency brake system will overcome the spring 80. Thus, when the emergency brake is not being used, the spring 80 holds the valve assembly in the one position wherein the tapered hub 76 seals its end of the bore 58 and when the emergency brake is activated the pressure in conduit 28 is sufficient to overcome the force of the spring and move the valve assembly to its other position wherein the tapered hub 78 seals its end of the bore 58, the hubs 76 and 78 being selectively spaced on the stem such that when one of them is in sealing engagement with the respective end of the bore, fluid can flow past the other hub. Diaphragm 66 has a plurality of apertures 83 to allow free flow of fuel therethrough and free flexing of the diaphragm in the cap 72.

Figure 3:
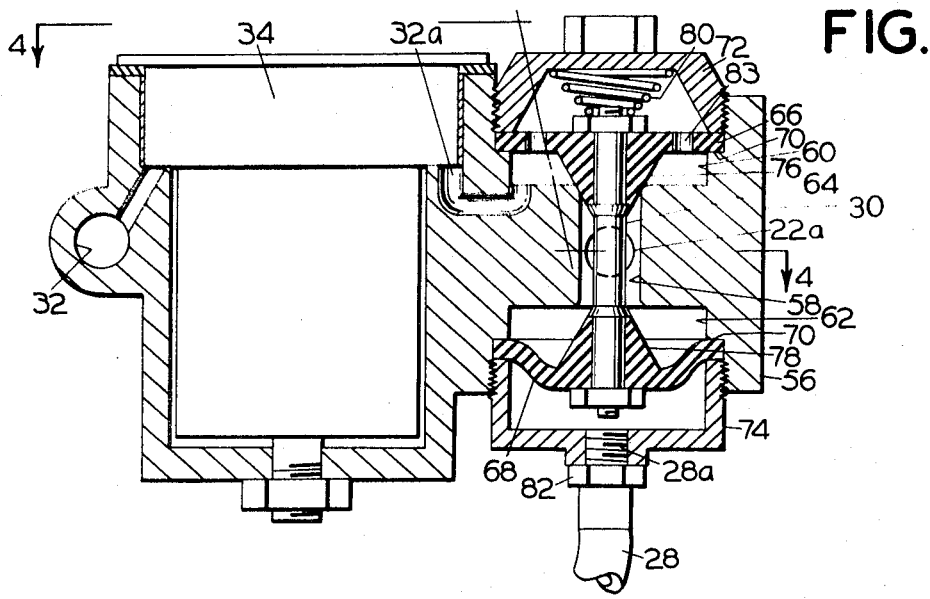
FIG. 3 is a central cross-sectional view of a housing structure in which is incorporated a novel arrangement of valve and flow meter and connecting passageways, taken on the line 3—3 of FIG. 4.
Figure 4:
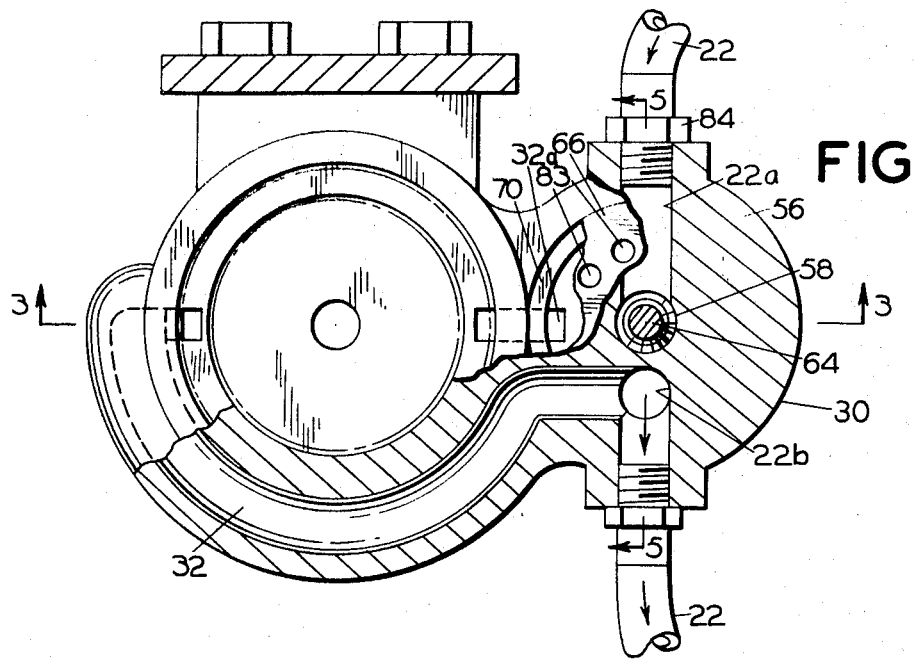
FIG. 4 is a sectional view taken on the line 4—4 of FIG. 3.
Figure 5:
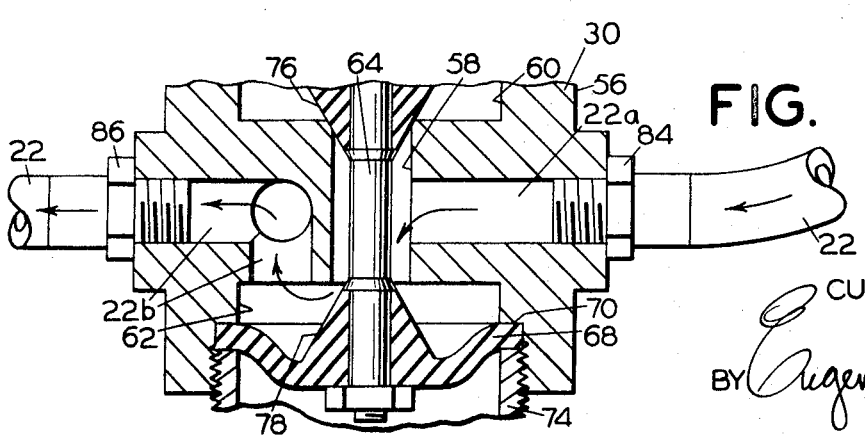
FIG. 5 is a fragmentary sectional view taken on the line 5—5 of FIG. 4.

Fuel line portion 22 from the fuel tank is connected to the housing by a fitting 84, FIGS. 4 and 5, and communicates with the bore 58 by means of passageway 22a in the housing. Outlet passageway 22b, FIG. 5, leads from the chamber 62 to the exterior of the housing for connection, by a suitable fitting 86, to the portion of the fuel line 22 which leads to the fuel mixing device 18. Leading from the chamber 60 to the meter 34, FIGS. 3 and 4, is passageway or bypass portion 32a, and leading from the outlet of the meter to outlet passageway 22b is passageway or by-pass portion 32.

When the emergency brake is inactivated, the spring 80 holds the hub 74 seated to seal off any flow of fuel through the passageway 32a to the meter. In such position of the valve, fuel from the tank flows from passageway 22a into the bore 58, chamber 62, passageway 22b, and back into the fuel line 22 for flowing to the fuel mixing device. Such comprises a normal unmetered flow of fuel, not considering of course the meter 36. When the emergency brake is activated, the pressure in conduit 28 overcomes the force of spring 80 and moves the valve stem to its other position, whereby fuel flow from fuel line 22 and passageway 22a is sealed off from the passageway 22b but is allowed to flow in the other direction in bore 58 and out the passageway 32a. Fuel can then flow through the meter 34 and thence through the passageway 32 to the outlet passageway 22b and to the fuel mixing device.

According to the present system, flow through meter 34 results only when the emergency brake is activated, and such metered flow is accurate and tamper-proof as a result of the direct connection of the valve into the emergency brake line. Also according to the present invention a system is associated with a vehicle structure which uses a return line. Such a system has a novel concept wherein the return line is connected back into the fuel line rather than into the fuel tank and a bubble eliminator is provided in the return line whereby applicant can measure full flow, by means of meter 36, directly from the tank. The meter which measures full flow must of course be connected on the fuel tank side of the valve 30 in order that its reading will consist only of fuel used from the fuel tank. By means of such structure, it is possible that a reading can be obtained of the full flow from the fuel tank even though the system employs a fuel return from the fuel mixing device. Thus, an accurate check can be maintained on the total fuel consumed.

It is to be understood that the form of my invention herein shown and described is to be taken as a preferred example of the same and that various changes in the shape, size and arrangement of parts may be resorted to without departing from the spirit of my invention or the scope of the subjoined claims. For example, it is to be understood that the present system can be utilized with other systems such as air, hydraulic, vacuum, or electrical, it only being necessary that the valve 30 be of a structure to provide the proper reaction. It is further to be understood that although reference is made in the description to the activating means as comprising emergency brake means, the present system may be used with any activating means, such as a power take-off, drive shaft, speedometer cable, etc, wherein it is desired that fuel consumption be measured by the meter 34 when the vehicle is being used for off-highway or non-taxable purposes.

Having now described my invention, I claim:

1. A fuel measuring system for vehicles adapted for metering fuel consumed by said vehicle only at selected times, the vehicle being of the type having a fuel tank, a fuel mixing device, a fuel line extending between the fuel tank, and the fuel mixing device, the fuel mixing device being of the type arranged to discharge unused fuel so that such unused fuel can be returned for burning, a fuel return line extending from the fuel mixing device, and shiftable vehicle operating means, said fuel measuring system comprising
   a. by-pass means arranged to be connected to the fuel line for by-passing fuel from the fuel tank around a portion of the fuel line,
   b. flow measuring means in said by-pass means,
   c. means arranged to connect the fuel return line to the fuel line on the downstream side of said flow measuring means from the fuel tank whereby the return flow is unmetered,
   d. means arranged to be connected in one of the vehicle fuel line and fuel return line to remove air bubbles from fuel returned through the fuel return line,
   e. and valve means at the juncture of the fuel line and said by-pass means arranged to be operably connected to the shiftable vehicle operating control means,
   f. said valve means having a pair of positions the first of which provides normal flow of fuel from the tank to the fuel mixing device and the second of which provides flow through said by-pass means to measure said flow.

2. The fuel measuring system of claim 1 wherein said means for removing bubbles comprises
   a. a tank,
   b. inlet means for the fuel return line connected to said tank,
   c. bubble removing means in said tank extending angularly relative to said inlet means whereby returned fuel impinges against said bubble removing means to remove air bubbles,
   d. outlet means for the fuel return line connected to said tank,
   e. and means in said tank maintaining a liquid level therein to provide non-influenced operation of the outlet means by the inlet means.

3. The fuel measuring system of claim 1 wherein said means for removing bubbles is connected into the fuel return line.

4. The fuel measuring system of claim 1 wherein said means for removing bubbles comprises
   a. a tank,
   b. inlet means for the fuel return line connected to said tank adjacent the upper end of the latter,
   c. baffle means angularly mounted in said tank and disposed below said inlet means whereby returned fuel falls on said angled baffle means to remove air bubbles,
   d. and outlet means for the fuel return line connected to said tank adjacent the lower end thereof.

5. The fuel measuring system of claim 1 wherein said means for removing bubbles comprises
   a. a tank,
   b. inlet means for the fuel return line connected to said tank adjacent the upper end of the latter,
   c. baffle means in said tank disposed below said inlet means whereby returned fuel falls on said baffle means to remove air bubbles,
   d. means defining an outlet opening for the fuel return line adjacent the lower end of said tank,
   e. and a float operated valve in said tank arranged to control the outlet flow of fuel from the outlet opening of said tank.

6. The fuel measuring system of claim 1 including second flow measuring means operably connected in the fuel line and arranged to meter fuel discharged from said fuel tank.

7. The fuel measuring system of claim 1 including
   a. a housing enclosing said valve means and said flow measuring means,
   b. means defining interior passageways in said housing leading between said valve means and said flow measuring means and to the exterior of said housing for connection to the fuel line,
   c. said by-pass means being disposed within said housing.

8. The fuel measuring system of claim 1 including
   a. a housing enclosing said valve means and said flow measuring means,
   b. means in said housing defining a first passageway leading from said valve to said flow measuring means and from said flow measuring means to said fuel line,
   c. means in said housing defining a second passageway leading from said valve to said fuel line,
   d. said valve means including a valve stem in said housing movable between two said two positions whereby to direct the flow of fuel through one or the other of said first and second passageways,
   e. and connecting means for connecting said housing to said fuel line, said fuel return line, and to said shiftable vehicle operating means.

9. The fuel measuring system of claim 1 including
   a. a housing enclosing said valve means and said flow measuring means,
   b. said valve means including a valve stem in said housing movable between said two positions,
   c. means in said housing defining a hollow portion for receiving said stem,
   d. said hollow portion being of greater diameter than said stem to permit fuel to flow therethrough,
   e. means on said valve stem controlling the direction of flow of fuel through said hollow portion, f. means defining a first passageway leading from the exterior of said housing to said hollow portion and arranged for connection to the fuel line from the fuel tank,
g. means defining a second passageway leading from one end of said hollow portion to said meter,
h. means defining a third passageway leading from the other end of said hollow portion to the exterior of said housing and arranged for connection to the fuel line extending to the fuel mixing device, i. and means defining a fourth passageway leading from said flow measuring means to said third passageway,
j. one position of the valve stem comprising the first position of the valve means wherein fuel flows through said first passageway to said hollow portion and out said third passageway and the other position of the valve stem comprising the second position of the valve means wherein fuel flows through said first passageway to said hollow portion and out said second passageway to said meter.

10. The fuel measuring system of claim 11 wherein said means for removing bubbles comprises
a. a tank,
b. inlet means for said fuel return line connected to said tank,
c. bubble removing means in said tank extending angularly relative to said inlet means whereby returned fuel impinges against said bubble removing means to remove air bubbles;
d. and outlet means for said fuel return line connected to said tank.

* * * * *

UNITED STATES PATENT OFFICE
CERTIFICATE OF CORRECTION

Patent No. 3,750,463   Dated August 7, 1973

Inventor(s) CURTIS L. ERWIN, Jr.

It is certified that error appears in the above-identified patent and that said Letters Patent are hereby corrected as shown below:

Col. 5, line 28, delete the comma (first occurrence).

Col. 7, line 10, "i" should begin a paragraph.

Col. 8, line 5, change "claim 11" to --claim 1--.

Signed and sealed this 5th day of February 1974.

(SEAL)
Attest:

EDWARD M. FLETCHER, JR.
Attesting Officer

RENE D. TEGTMEYER
Acting Commissioner of Patents